Patented Oct. 6, 1953

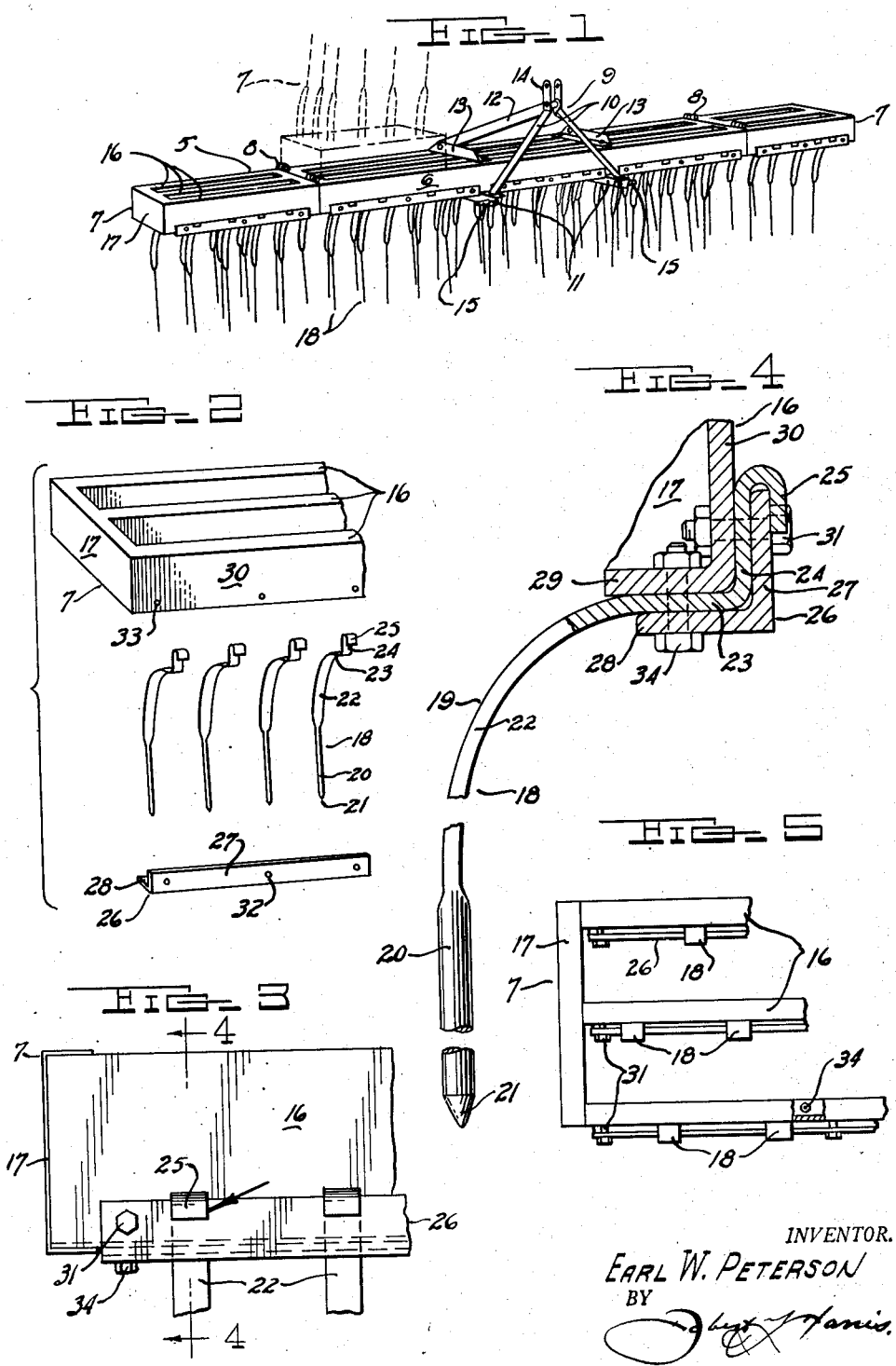

2,654,197

UNITED STATES PATENT OFFICE 2,654,197

AGRICULTURAL IMPLEMENT AND TINE CONSTRUCTION THEREFOR

Earl W. Peterson, Chicago, Ill., assignor to Dearborn Motors Corporation, Detroit, Mich., a corporation of Delaware Application November 7, 1947, Serial No. 784,577

2 Claims. (Cl. 55—36)

This invention relates to agricultural implements; and more particularly, to a toothed or tined cultivating implement and a method of attaching the teeth or tines therein.

An example of the device of this invention is that commonly known as a weeder. This comprises a supporting frame to which are attached a number of flexible teeth or tines. Generally, these teeth are arranged in transversely spaced relationship in several successive rows, the teeth in each row being offset so that the area worked over is thoroughly subjected to the weeding action. It may be noted here that—in distinction to the row cultivators—the crop itself is subjected to the weeding action, the teeth or tines not being so spaced or the weeder so directed as to avoid the crop plants. However, because of the differences in root structure, the tines will remove the weeds without adverse effect on the crop and will provide light cultivation through the breaking of the soil crust aiding in seed bed aeration and promoting vigorous crops. Since the unit draft force required is relatively small, the weeder may be made quite broad and as it does not require the precise steering needed with a row cultivator, it may be operated at relatively high speeds and a considerable acreage of land covered per day. For this reason, it is desirable that the weeder be as light as possible consistent with the demands of frame rigidity and durability.

These weeders are quite simple in construction but there is one considerable problem involved and that is the method of attaching the teeth or tines to the framework. In the first place, the number of these elements is much greater than that of the corresponding ground engaging elements used in other cultivators. Fastening each tine separately is a time-consuming procedure, expensive in its requirement for duplicated fastening mechanism, and results in a weakening of the frame because of the large number of fastening apertures required. Individual fastenings are further undesirable because they limit the tine spacings and offsets which may be employed. Further, since the teeth are inherently resilient, the conventional fastening means are continually subjected to vibrational stresses which sooner or later cause them to loosen or the tines to work out of alignment.

An object of this invention, therefore, is to devise a means of fastening teeth or tines to an agricultural implement in a group rather than individually. Another object is to provide such a fastening means which will be proof against loosening under the vibrational stresses imposed by the resiliency of the teeth. Yet another object is to devise a mounting in which the individual teeth are freely adjustable to allow variation in spacing between teeth in one row or in offset as between teeth in successive rows. A further object is to fasten the tines so that neither the tines nor the frame are unduly weakened by reason of attaching holes. Still another object is to devise a fastening which will impart and maintain a precise alignment—vertically, transversely and longitudinally—to the tines so secured. Another object is to create a fastening which, in spite of its strength, will be light. A final object is to devise a fastening which will be economical to manufacture and assemble.

Each of these ends is attained in the structure disclosed here. The tines may be assembled and attached in gangs with the widest possible latitude of individual adjustment and certainty of maintained alignment. The fastening is secure and yet may be applied in a minimum of time and with maximum economy. Far from weakening either the frame or tines, the fastening shown actually serves as a reinforcing for both, and, particularly in the case of the tines, distributes the stresses imposed in an area in which they may best be resisted. The fastening is light in weight and may be securely locked.

While a specific form of implement is shown, it will be readily understood that the invention disclosed may be applied to other implements presenting a like fastening problem.

With these considerations in view, the invention consists of the device described in the accompanying specification, claimed in the following claims and shown in the attached drawings, in which:

Figure 1 is a perspective view of a weeder embodying the present invention.

Figure 2 is an exploded perspective view on an enlarged scale showing the components of the device.

Figure 3 is a front fragmentary elevation of the device as assembled.

Figure 4 is a section showing the assembled device taken on the line 4—4 of Figure 3.

Figure 5 is a fragmentary plan view showing the offset spacing of the tines in successive rows.

Referring first to Figure 1, a weeder is shown at 5 having a center frame section 6 and two end frame sections 7 hinged to the former at 8 and which may be swung upwardly and inwardly as shown in dotted line to reduce the span of the device when it is inoperative in transport. Attached to the center frame section 6 in an A frame 9 comprising forward struts 10 attached at their lower ends to the lower longitudinal members 11 and rear struts 12 attached at their lower ends to the upper longitudinal members 13. The upper ends of struts 10 and 12 are joined at 14 forming a clevis serving as one element of a three-point lift attachment of a common type—the other two elements being the pins 15 carried on the lower longitudinal members 11.

Each frame section comprises three transverse rails 16 permanently joined at each end by the sections 17 forming a rectangular box to which the tines 18 are secured. These tines, as best seen in Figure 4, are preferably made from rectangular stock, the upper half as at 19 serving as a leaf spring of considerable flexibility while the lower part 20 is formed to a round having substantial rigidity and sharpened to a point 21. The lower part 22 of the rectangular section is bent substantially through a quadrant ending in a horizontal tangent 23 from which it bends upwardly through 90° for the vertical reach 24 and is then turned over to form a reverse flange or hook section 25. The portions 23 and 24 of these tines form an attachable section and are secured in place by the attaching angle 26 having an upper leg 27 fitting within the reverse flange 25 and a lower leg 28 seated beneath the tangent portion 23 of the tine 18. The inner surfaces of the tangent portion 23 and the vertical reach 24 nest against the lower flange 29 and web 30 of the frame rail 16. The angle 26 is secured to the web 30 of the rail by spaced bolts 31 extending through holes 32 and 33 in the angle and web respectively. It is further locked in place by adjacent bolts 34 extending through the lower rail flange 29 and the lower leg 28 of the angle 26.

The ease of assembly and adjustment with this device is believed to be obvious from the foregoing. The angle 26 may be held manually in the position shown in Figure 2 and the individual tines hung on it by engaging their hook section 25 over the top of the upper leg 27. After the tines are roughly spaced, the angle 26 and tines suspended thereon are nested against the rail 16 and held there while the bolts 31 are inserted and loosely fastened. The tines can then be adjusted to the precise spacing desired such as that shown in Figure 5 by lightly tapping them on the exposed reverse flanges 25—for example as indicated by the arrow in Figure 3. The bolts 31 are then tightened and the device further locked by the insertion and tightening of bottom bolts 34.

It will be noted that this construction, while permitting wide latitude of adjustment, provides for accurate and maintained alignment of the individual tines. It is not necessary to perforate the tines or form them in shapes which decrease their structural strength. The bending forces are distributed through the quadrant section, rather than being localized at a particular point, due to the clamping action between the plane surfaces of the rail flange and lower angle leg. The tines cannot cant sidewardly nor rotate about a vertical axis. The inherent resiliency of the attaching angle so far as the bolts 31 are concerned when disposed in unsupported spans between adjacent tines keeps the bolts under tension and prevents their loosening under vibration. The bottom bolts further secure the attaching angle which, far from weakening the basic structure as do many other fastening means, actually reinforces the frame sections. While an angular conformation is shown in the nesting parts, it will be understood that this may be modified—for example to a quadrant—if desired.

Although a specific embodiment of the device is shown, it is the intention to cover by the claims such variations therein as are within the allowable scope of the invention.

The invention claimed is:

1. An agricultural implement having a frame, ground-engaging tines, and a removable clamping member for securing a group of said tines to said frame, said frame including a member having adjacent angularly disposed surfaces; characterized by the upper portion of each of said tines having an attachable section bent to conform to said angularly disposed frame surfaces for engagement therewith, said removable clamping member having at least one surface adapted to engage said attachable section of each tine, securing means between said clamping member and said frame member for drawing said clamping member into firm engagement with each tine positioned between said two members, and means for supporting each tine independently of the action of said securing means comprising a hook section formed on the upper end of each tine, said hook section having an open end disposed downwardly when the tine is substantially in a normal ground-working position, said hook section engaging said clamping member to support the weight of said tine when said securing means are loosened.

2. A tine for an agricultural implement having a ground-engaging portion and an upper portion adapted to be engaged between a frame member and a clamp member; characterized by said upper portion having an attachable section comprising a pair of angularly disposed surfaces adapted to engage said frame, said upper portion terminating in a hook section overlying and spaced outwardly from one of said surfaces and adapted to engage said clamp member, said hook section being formed in part by the reverse side of one of said frame-engaging surfaces, and having its open end disposed downwardly when said tine is in working position whereby said tine may be suspended from said clamp member.

EARL W. PETERSON.

References Cited in the file of this patent

UNITED STATES PATENTS

| Number | Name | Date |
|---|---|---|
| 390,276 | Young | Oct. 2, 1888 |
| 432,168 | O'Neil et al. | July 15, 1890 |
| 1,180,563 | Benson | Apr. 25, 1916 |
| 1,276,270 | Rieske | Aug. 20, 1918 |
| 1,723,985 | Richardson | Aug. 6, 1929 |
| 1,992,313 | Langley | Feb. 26, 1935 |
| 2,036,052 | King | Mar. 31, 1936 |
| 2,259,890 | Hipple | Oct. 21, 1941 |